G. M. HUSTON.
Egg-Carriers.

No. 133,315.

Patented Nov. 26, 1872.

Witnesses

Figure 2:
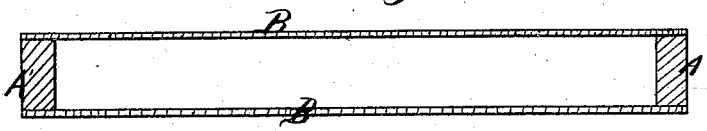

Inventor ical view, and Fig. 2
UNITED STATES PATENT OFFICE.

GEORGE M. HUSTON, OF SAN FRANCISCO, CALIFORNIA.

IMPROVEMENT IN EGG-CARRIERS.

Specification forming part of Letters Patent No. 133,315, dated November 26, 1872.

*To all whom it may concern:*

Be it known that I, GEORGE M. HUSTON, of San Francisco, San Francisco county, State of California, have invented an Improved Egg-Carrier; and I do hereby declare the following description and accompanying drawing are sufficient to enable any person skilled in the art or science to which it most nearly appertains to make and use my said invention or improvement without further invention or experiment.

My invention relates to an improved case or frame for containing and carrying eggs desired for transportation. My improvement consists in providing two elastic or yielding surfaces so arranged and applied that the eggs to be carried will be held firmly between them without the necessity of pockets or compartments, and by which I obtain several decided advantages over the ordinary egg-carriers.

In order to more fully illustrate and explain my invention, reference is had to the accompanying drawing forming a part of this specification, in which—

Figure 1:
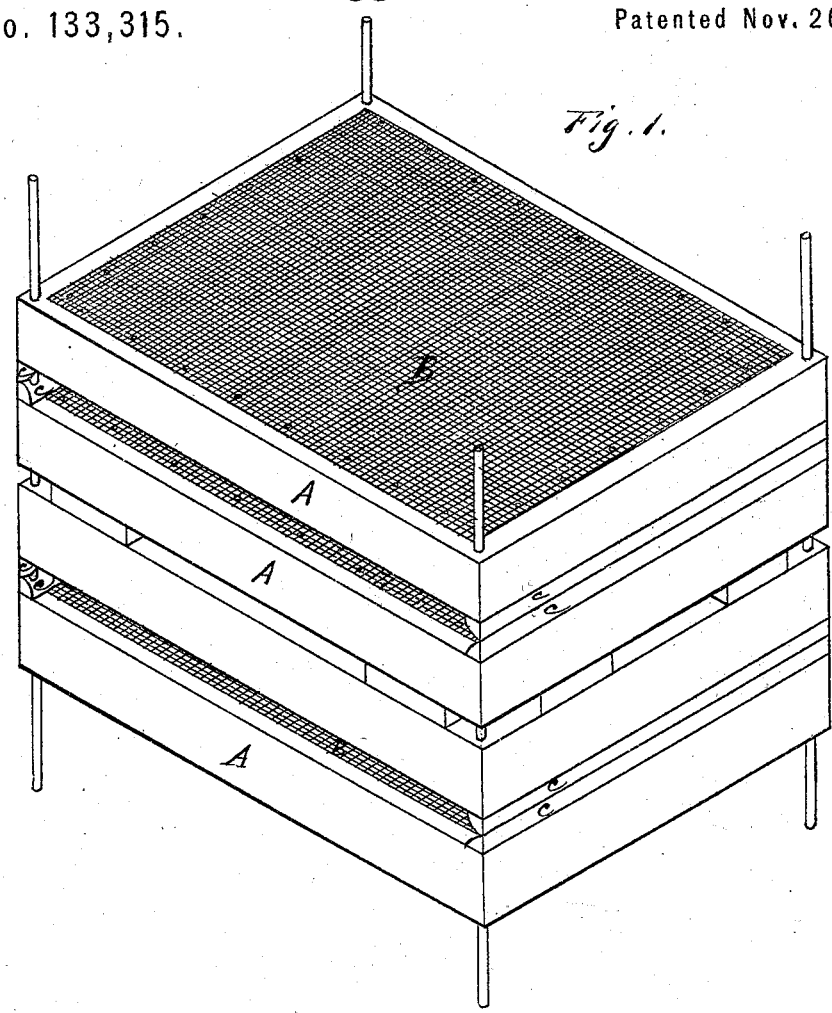

Figure 1 is an isometrical view, and Fig. 2 is a sectional view of part of the frame.

A represents a square or other suitably-shaped frame. Across this frame, upon both sides, I stretch a piece of burlaps, canvas, or other suitable cloth or elastic material, B, and secure it to the sides of the frame by means of tacks, or by other suitable fastenings. Upon both sides of the frame I secure, upon the edge of two of the side rails opposite each other, a ledge, C, for the purpose hereinafter described. The eggs or fruit to be packed are placed loosely upon the canvas or other material of one of the frames, preferably in a row. Another frame is then placed down over them, so that the canvas or other material on the under side of the latter or upper frame will press upon the eggs or fruit. The ledges C should not be wide enough to meet until a pressure is brought to bear upon the upper frame; but a space of nearly half an inch should be left until the pressure is applied. Then, when the frames have been pressed together, the eggs or fruit will be held between the two elastic or yielding surfaces. No division strip or compartment is required, but the eggs or fruit will be simply laid upon the cloth, thus avoiding the trouble of placing the eggs or fruit within, or removing them from, the usual pockets.

This plan permits the air to circulate freely about the eggs or fruit, more especially as the opposing ledges C are only placed at two of the sides. The other sides are open, and serve not only to admit air, but also allow the contents to be seen from the outside of the case.

In packing eggs or fruit the lower or bottom frame will be provided with a wooden bottom and canvas top. The articles to be packed are then placed upon the canvas or other material used until the surface is covered. A frame with canvas or other material on both its bottom and top is then placed over the layer, and another layer is placed upon the upper surface, and so on until the desired height of the case has been reached, when another frame with closed upper end will be placed upon the top. The whole number of frames are then secured together by iron rods at the corners, or by other suitable means. In this fastening together sufficient pressure is applied to close the ledges down until they meet, thus binding the eggs or fruit between the two yielding surfaces, so that they cannot move or strike a hard substance. When the pressure is applied the canvas or other yielding material will be depressed above and below, so as to create a bed for the eggs or fruit, and this depression prevents them from coming in contact with the wooden frame.

By this means I provide a simple, cheap, and effective egg or fruit packer, in which the safety of the eggs or other substance, and suitable provision for the ventilation and inspection, are provided for.

If desired, the frames can be placed inside of a box or crate, and the pressure be applied in putting on the lid or cover of the box. In this case the outside box will be provided with suitable holes or openings to admit air to the interior.

In place of the ledges C a narrow frame could be interposed between the frames A.

Having thus described my invention, what I claim is—

The egg and fruit carrier, consisting of the frames A, with their ledges C, or equivalent separating-strips, when said frames are provided upon both sides with a yielding cover or cushion, and employed substantially as described.

In witness whereof I hereunto set my hand and seal.

G. M. HUSTON. [L. S.]

Witnesses:
 I. L. BOONE,
 C. M. RICHARDSON.